May 6, 1952  J. R. MORRIS  2,595,402

DEVICE FOR CUTTING SHEET MATERIAL

Filed Jan. 29, 1947   3 Sheets-Sheet 1

INVENTOR.
Joseph R. Morris
BY Nobbe & Swope
ATTORNEYS

May 6, 1952 J. R. MORRIS 2,595,402
DEVICE FOR CUTTING SHEET MATERIAL
Filed Jan. 29, 1947 3 Sheets-Sheet 2
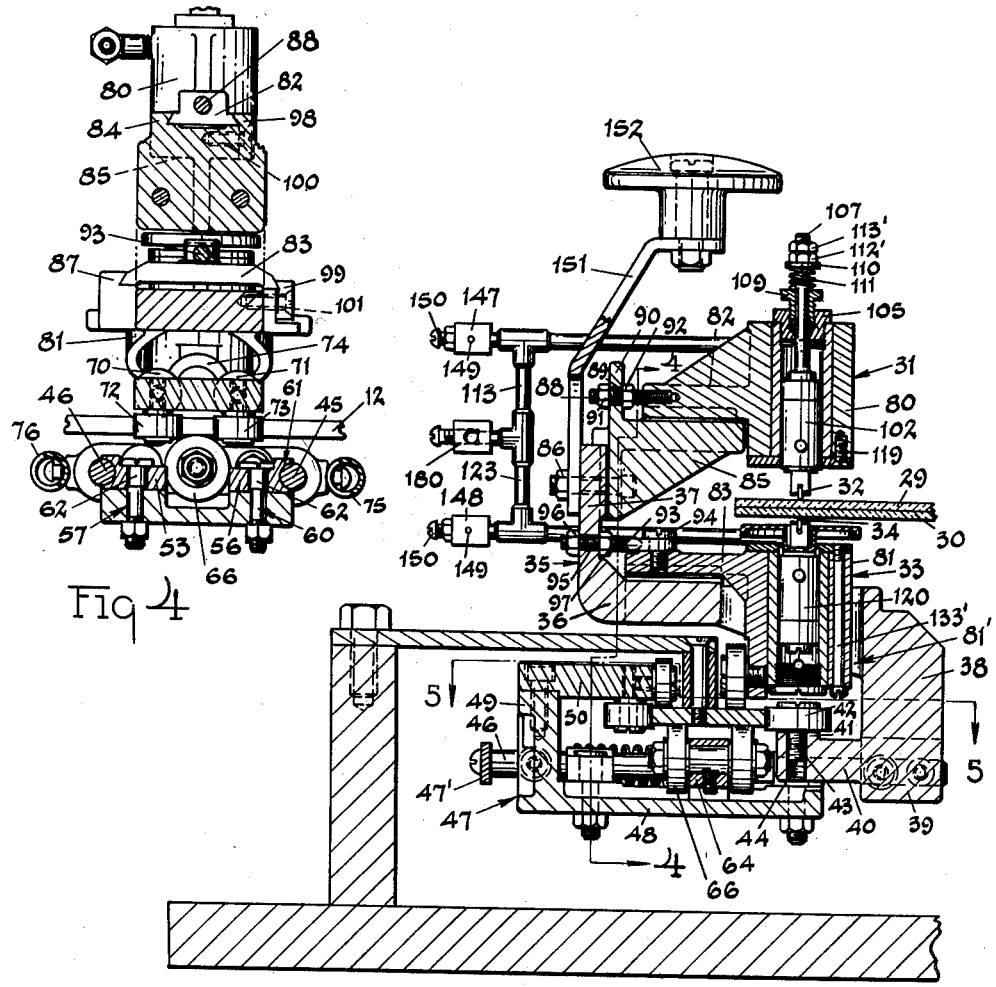
Fig 4
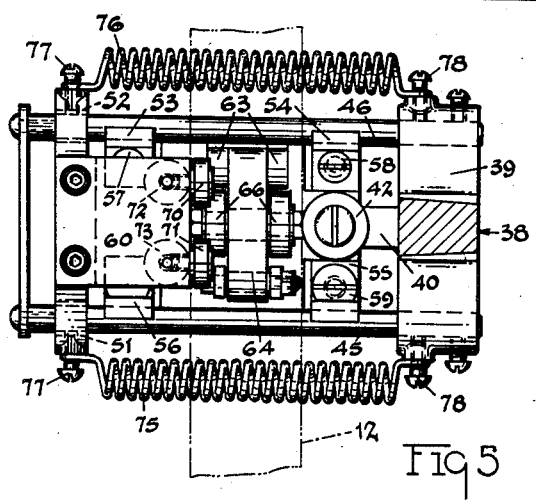
Fig 3
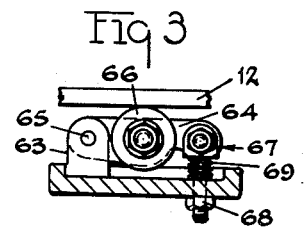
Fig 6
Fig 5
INVENTOR.
Joseph R. Morris
BY
Nobbe & Swope
ATTORNEYS May 6, 1952     J. R. MORRIS     2,595,402

DEVICE FOR CUTTING SHEET MATERIAL

Filed Jan. 29, 1947     3 Sheets-Sheet 3

INVENTOR.
Joseph R. Morris
BY Nobbe & Swope
ATTORNEYS

Patented May 6, 1952

2,595,402

UNITED STATES PATENT OFFICE 2,595,402

DEVICE FOR CUTTING SHEET MATERIAL

Joseph R. Morris, Toledo, Ohio, assignor to Libbey-Owens-Ford Glass Company, Toledo, Ohio, a corporation of Ohio Application January 29, 1947, Serial No. 725,022

18 Claims. (Cl. 33—27)

The present invention relates to the cutting or marking of sheet materials such as glass, and more particularly to a novel apparatus for cutting such sheets along a predetermined path.

The machine of the invention is especially valuable for simultaneously scoring opposite sides of a pair of curved or bent sheets of glass which have been nested together for that purpose.

Briefly stated, the machine comprises a cutter carriage mounted for movement along a template and carrying a cutting tool or tools which are adapted to engage and score the sheet or sheets to be cut during travel of the carriage.

An important object of the invention is the provision of a cutting machine of the above character for cutting out from sheets or plates of glass, and particularly from bent or curved sheets, shapes of predetermined contour, accurately, rapidly and economically.

Another object is to provide such a machine for cutting along two parallel oppositely disposed lines on opposite sides of a pair of nested sheets so that both sheets can be cut in a single operation.

Another object is the provision of a cutting machine of this character including a pair of cutting units connected together so that they operate in unison and insure the opposed score lines being directly opposite and in alignment with each other.

Another object is to provide a machine of this type that can be supported upon and guided along a single track or template.

Another object is the provision of fluid means for exerting pressure on the cutting tools to urge them into scoring contact with the sheet, and of means for controlling the amount of fluid pressure exerted upon any one of said cutting tools.

Another object is the provision of work locating means that will insure proper positioning of the sheets to be cut with relation to the cutting machine.

Still another object is to provide indicating means in combination with the work locating means for indicating when the sheets approach the desired position with relation to the cutting machine, and also when they actually are in such position.

Other objects and advantages of the invention will become more apparent during the course of the following description, when taken in connection with the accompanying drawings.

In the drawings, wherein like numerals are employed to designate like parts throughout the same:

Fig. 3 is a vertical sectional view taken substantially along the line 3—3 in Fig. 1;

Fig. 4 is a vertical sectional view taken substantially on the line 4—4 in Fig. 3;

Fig. 5 is a horizontal sectional view taken substantially on the line 5—5 in Fig. 3;

Fig. 6 is a detail view of the clamping wheels that engage the lower side of the template;

Figure 1:
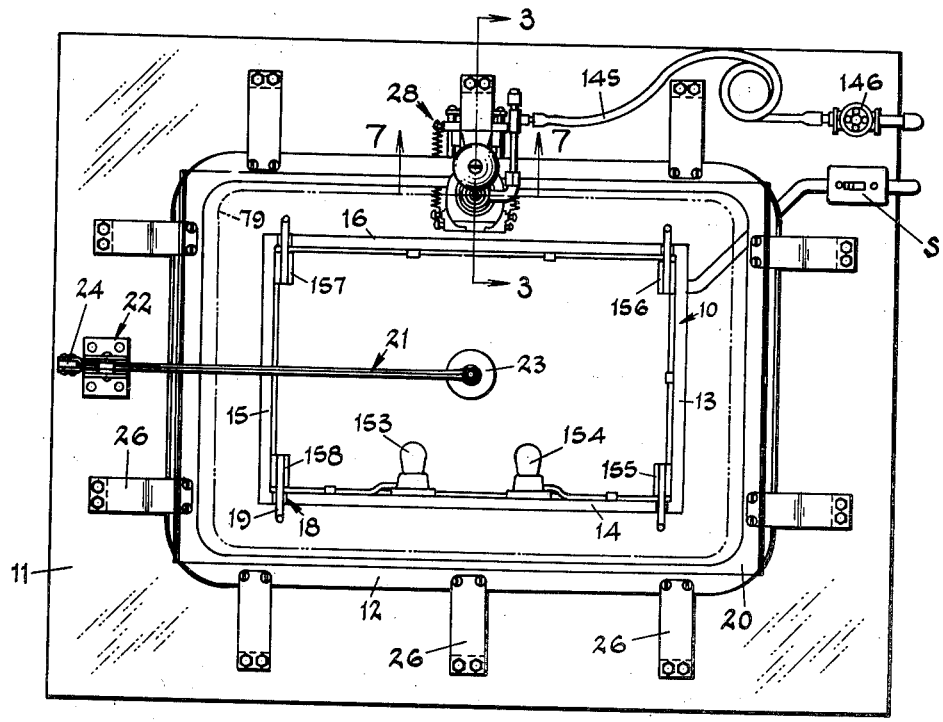
Fig. 1 is a plan view of the cutting machine of the invention showing a pair of curved glass sheets nested together and in position to be scored.
Figure 2:
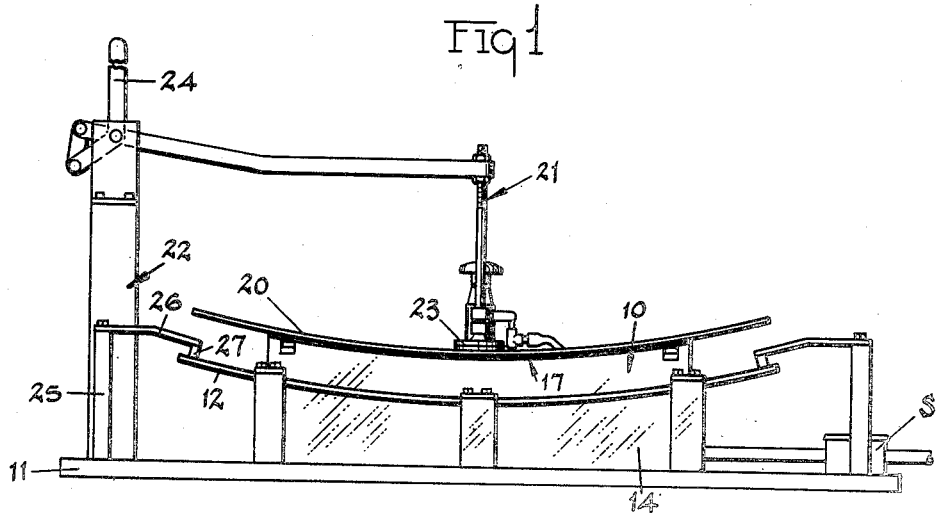
Fig. 2 is a side elevation of the machine shown in Fig. 1.

Referring now more particularly to the drawings, the apparatus shown there includes a work support 10, mounted on a table 11, and surrounded by a template 12 for supporting and guiding the cutting mechanism (Figs. 1 and 2). The support 10 is in the form of an open, rectangular, box-like member having four sides 13, 14, 15 and 16, the upper edges of which are shaped as at 17 to conform to the shape of the lower surface of the glass sheet or sheets that are to be supported thereon for cutting.

The sides 14 and 16 of the work support 10 are cut out as at 18 to receive switch operating arms 19 which assist in accurately locating the glass sheets to be cut. The operation of these devices will be more clearly hereinafter explained and it is sufficient to say here that they permit very exact positioning of the sheet to be cut on the work support 10.

Once the glass sheets 20 to be cut are properly located, it is desirable to lock them in this position until the cutting operation has been completed. This can be done by means of a quick acting clamp 21 of the usual construction which, in this case, is mounted on a pedestal 22 carried by the table 11, and includes a glass engaging pad 23, and a handle 24 for moving the clamp into and out of operative position.

The template 12 which surrounds the work support 10 is supported on a series of pedestals 25, arranged around the margins of the table 11, through arms 26 and blocks 27, in a position calculated to permit proper cutting engagement between a cutter carriage 28, supported and guided by the template, and the glass sheets to be cut.

As indicated above, the cutting machine of the invention is particularly valuable for simultaneously scoring opposite sides of a pair of curved or bent sheets of glass which are nested together. For example, it can be used in the salvage cutting of laminated safety glass, or to simultaneously cut exactly the same shape or pattern from two glass sheets, which have been bent together as a pair, prior to laminating them, with an interposed plastic interlayer, into a bent safety glass unit of predetermined pattern.

Figure 7:
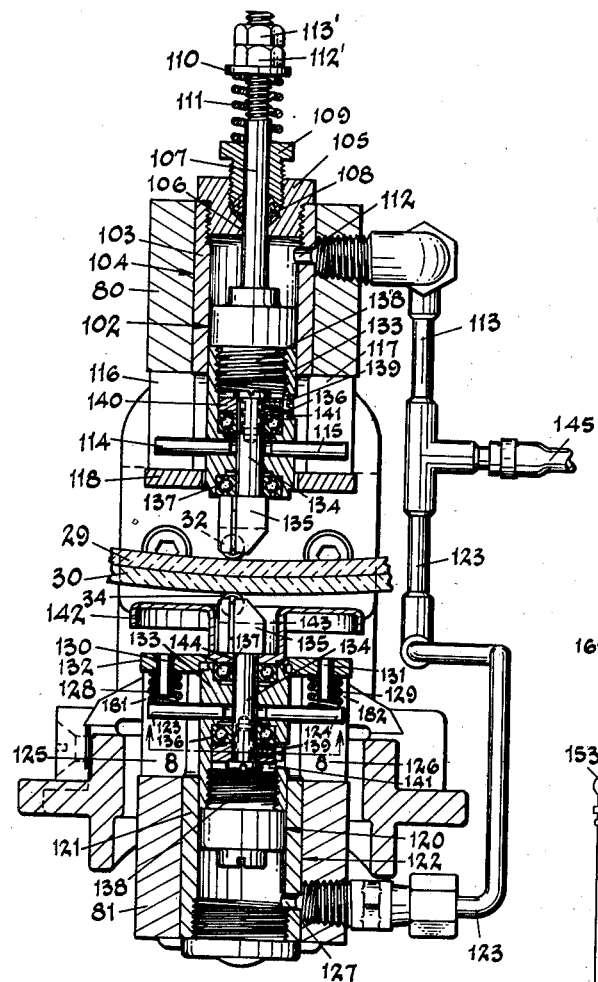
Fig. 7 is a vertical sectional view taken substantially on the line 7—7 in Fig. 1.
Figure 9:
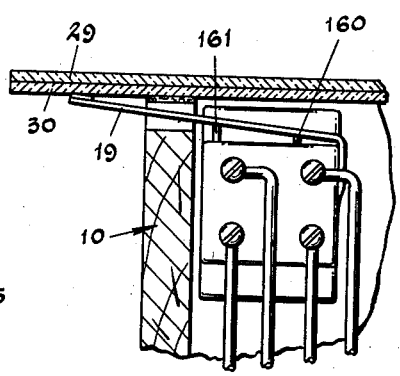
Fig. 9 is a fragmentary, diagrammatic, sectional view of one of the contact members on the work positioning element of the cutting machine.

In this latter case, the work 20 will consist specifically of two curved sheets of glass 29 and 30 (Figs. 3 and 7) which have been bent as a unit and so will nest perfectly together. When two such sheets have been clamped in place on the work support 10 in the manner described above, they will be in position for engagement by the cutting mechanism and are ready to have a window, windshield or other shape cut therefrom.

The cutting mechanism 28, as explained above, is adapted to be supported and guided along its cutting path by the template 12 upon which it is mounted (Figs. 1 and 3) and which, of course, determines the pattern or shape which will be cut out by the cutting mechanism during its travel.

The cutting mechanism or cutter carriage comprises an upper cutting unit 31 carrying a cutting wheel 32, and a lower cutting unit 33 including a cutting wheel 34, both of which units are adjustably mounted on a cutter casting or frame 35. This frame comprises a horizontal plate portion 36 having a vertical plate portion 37 extending upwardly from one end thereof and an inverted T-shaped portion 38 extending downwardly from the opposite end. The head 39 of the T-shaped portion 38 is provided with a centrally located, horizontal extension 40 therefrom, and carried by a boss 41 on the upper face of this extension is a horizontally rotatable wheel 42, mounted on a vertical shaft 43 which is threaded into a tapped opening 44 in the body of the horizontal extension 40. The head 39 also carries a pair of horizontal shafts 45 and 46 on which is reciprocally mounted a slide 47, that is roughly C-shape in cross section. The slide 47 comprises a flat horizontal lower plate portion 48, a vertical end portion 49 and a flat horizontal top plate 50 which is considerably shorter than the bottom plate.

As the means for movably mounting the slide 47 on the shafts 45 and 46, the vertical end portion 49 of the slide is provided with drilled horizontal holes 51 and 52 adjacent its opposite ends and through which the shafts 45 and 46 are adapted to pass. In addition, the plate portion 48 carries four blocks 53, 54, 55 and 56 which are arranged two along each side and adjacent the opposite ends of the plate 48 and secured to the top surface thereof by flat headed shouldered machine screw and nut assemblies 57, 58, 59 and 60. The blocks 53, 54, 55 and 56 are grooved at one side as at 61 to form a fitted slide means for engaging the shafts 45 and 46, and the shoulder portions 62 on the shouldered machine screws of the screw and nut assemblies 57, 58, 59 and 60 are offset to permit horizontal adjustment of the blocks relative to the shafts 45 and 46 upon turning of the screws of the screw and nut assemblies (Fig. 4). The slide 47 is prevented from slipping off the rods 45 and 46 by a plate 47' secured to the ends of the rods by suitable machine screws.

Also formed on the top surface of the plate 48 between its ends are spaced bearing members 63 (Figs. 5 and 6) adapted to receive between them one end of an arm 64 which is pivoted to the bearing members by a pivot pin 65. Carried at opposite sides of the pivoted arm 64 midway its ends are vertically rotatable wheels 66 for engaging the bottom face of the template 12; and pivotally mounted at opposite sides of the arm 64 at its free end are downwardly depending shackle bolts 67. The threaded ends of these shackle bolts extend downwardly through drilled openings in the plate 48 and are provided with nuts 68. A compression spring 69 surrounds the shank of the shackle bolts 67 between the head of the bolt and the plate 48. In this way the springs 69 act to continually urge the free end of the arm 64, and consequently the wheels 66, upwardly, the extent of such upward movement being limited by the nuts 68.

Carried at the forward end of the upper plate 50 are a pair of vertically rotatable wheels 70 and 71 adapted to engage the top surface of the template 12 adjacent its outer edge, and suspended from the bottom of the plate 50 adjacent the same end is a pair of horizontally rotatable wheels 72 and 73 which are adapted to engage the outer side edge of the template 12.

As already pointed out a horizontally rotatable wheel 42 is carried by the extension 40 on the cutter casting 35 and is adapted to engage the inside edge of the template 12 at a point directly opposite the space between the wheels 72 and 73; and a vertically rotatable wheel 74 is mounted on the lower cutting unit 33 in a position to engage the top surface of the template 12 above one of the wheels 66 and opposite the space between the two wheels 70 and 71.

With this arrangement, the cutter casting 35 and the slide 47 will have rolling contact with opposite sides and with opposite edges of the template 12. It is also desired to clamp the template between the wheels on the casting and the wheels on the slide. In the case of the wheels 70, 71 and 74 in rolling contact with the top surface of the template and wheels 66 contacting the bottom surface of the template, the result is obtained by means of the compression springs 69 which act to urge the wheels 66 upwardly against the bottom of the template. Similarly, the pair of wheels 72 and 73 on the slide 47 and the single wheel 42 on the casting 35 will clamp the edges of the template 12 therebetween by means of a pair of tension springs 75 and 76, each of which has one end thereof secured to a machine screw 77 threaded into the vertical end portion 49 of the carriage 47 and the opposite end secured to a machine screw 78 threaded into the head of the T-shaped portion 38 of the casting 35.

It will be seen from the above that the complete cutter carriage assembly, which is made up of the cutter casting 35 and the carriage 47, is clamped to the template 12 for rolling contact therewith and that it is supported and guided entirely by the template. By reason of the arrangement of two wheels 72 and 73 engaging the outside edge of the template 12, and a single wheel 42 engaging the inside edge of the template between the two outside wheels, the cutter carriage assembly can be moved along and will follow either a straight or curved shape of template with equal facility. Any curve of template can be followed, including a curve around a relatively sharp corner, as shown at 79 in Fig. 1, so long as the radius of curvature at the inside of the template is not less than the radius of the wheel 42.

The upper and lower cutting units 31 and 33 which are carried by the cutter casting 35 include cylindrical cutter housings or blocks 80 and 81 respectively which carry supporting plate members 82 and 83 respectively. These plate members 82 and 83 are dovetail shaped in cross section as shown in Fig. 4, and the plate 82 is mounted for horizontal movement in a correspondingly shaped slide 84 on the top of a bracket 85 which is secured to the upright 37 of the cutter casting by socket head machine screws 86 threaded into the upright, while the plate 83 is mounted for similar movement in a correspondingly shaped slide 87 on the top of the horizontal plate 36. To properly position the cutter units 31 and 33 relative to their respective supporting slides, an adjusting screw 88 is threaded into the plate member 82 of the upper cutting unit, and the opposite end of the adjusting screw passes through an opening 89 in a vertical extension 90 on the bracket 85. Nuts 91 and 92 are threaded onto the adjusting screw 88 at either side of the extension 90 and can be used to move the plate 82 back and forth on its slide.

In a similar manner, a shackle bolt 93 is secured to the top of the plate 83 on the cutter unit 33 by a machine screw 94 passing through the shackle eye and being threaded into the plate 83. The threaded bolt portion 95 passes through an opening in the upright 37 and is provided with nuts 96 and 97 on either side of the upright to effect the desired adjustment of the lower cutter unit. The cylinder block 81 of the lower cutting unit is received and moves within a vertical opening 81' in the casting or frame 35.

The slide 84 and the slide 87 are formed with removable clamping plates 98 and 99 respectively at one side thereof, and by tightening of the screws 100 and 101 respectively, after the cutter units have been properly positioned, the plates 82 and 83 will be securely locked in place on their respective slides.

The cutting wheel 32 of the upper cutting unit 31 is carried at the lower end of a piston 102 which is mounted for vertical reciprocatory movement in a sleeve 103 fitted into the cylinder 104 in the block 80. The upper end of the sleeve 103 is closed by a plug 105 threaded therein and provided with a central opening 106 through which passes a rod 107 extending vertically from the upper end of the piston 102. A suitable packing gland is provided as at 108 and, surrounding the rod 107 between the top of the packing screw 109 and a washer 110, is a compression spring 111. A pair of nuts 112' and 113' are threaded onto the upper end of the rod above the washer 110 to adjust the pressure exerted by the spring 111.

With this arrangement, the cutting wheel 32 will normally be held upward out of the plane occupied by the glass sheets when they are in position to be cut by reason of the spring 111 which acts to retract the piston into the cylinder. However, upon introduction of fluid under pressure into a port 112 in the sleeve 103 from a conduit 113, the spring action will be overcome and the piston forced downwardly to bring the cutting wheel 32 into cutting engagement with the glass. The piston 102 is prevented from rotating within the cylinder by the provision of a pair of horizontal rods 114 and 115 carried at opposite sides of the piston and which extend through slots 116 and 117 cut through the cylinder block 80 and sleeve 103. Upward vertical movement of the piston 102 is limited by the top of the slots 116 and 117 and downward vertical movement by a plate 118 which is secured to the bottom of the cylinder by machine screws 119 (Fig. 3).

Similarly, the lower cutter unit includes a piston 120 operative within a sleeve 121 in the cylinder 122, and carrying at its upper end the cutting wheel 34. Similar horizontal rods 123 and 124, slidable in slots 125 and 126 in the side walls of the sleeve and cylinder, are also provided to prevent turning of the piston, and a similar port 127 is cut in the wall of the sleeve so that fluid under pressure can be forced into the cylinder 122 from a conduit 123 to move the piston 120 and the cutting wheel 35 upward into cutting position. The means for normally urging the cutting wheel 35 downwardly out of cutting position is, however, somewhat different. Thus, this is accomplished here by the provision of a pair of compression springs 128 and 129 encircling posts 130 and 131 which extend downwardly from a ring 130 which is secured to the top of the cylinder block 81 by the machine screws 133' passing therethrough. These compression springs 128 and 129 are located in slots 181 and 182 respectively between the rods 123 and 124 and the ring 132, and act to urge the rods 123 and 124 downwardly away from the ring.

The pistons 102 and 120 are of identical construction and each comprises a body portion 133 which is drilled to receive a spindle 134 which carries the cutter heads 135 for the cutting wheels 32 and 34, and also ball bearing assemblies 136 and 137 in which the spindles 134 are rotatably mounted. The drilled openings in the body portions 133 have their ends opposite the spindles 134 closed by a plug 138 threaded therein.

It will be noted that the cutter heads 135 and the cutting wheels 32 and 34 are offset with respect to the center line of the spindles 134. This is for the purpose of causing the cutting wheel to trail the spindle upon movement of the cutting units along the template 12 and to so maintain the cutting wheels parallel with the path of travel of the cutting mechanism and also parallel to the path of cut. In order to retain the cutting wheels 32 and 34 in approximate parallelism with the path of cut when they are out of cutting position, machine screws 139 are threaded into the thrust washers 140 surrounding the spindles 134 adjacent their outer ends. The heads of these screws extend outwardly from the washers and are received within slots 141 in the body portions 133 of the pistons. The width of the slots 141 (Fig. 3) limits the possible rotary movement of the spindles and thus causes the cutting wheels to always engage the glass in approximate parallelism with the proposed line of cut so that the wheels will move immediately into trailing position with the first cutting movement of the cutting means along the template 12.

The lower cutter unit 33 may be provided with a round shield member 142 having a well portion 143 for receiving the cutter head and an opening 144 at the bottom of the well to permit the shield to be mounted in surrounding relation to the spindle 134 between the cutter head 135 and the top of the ball bearing assembly 136.

Fluid under pressure, preferably air, is fed to the interior of the sleeves 103 and 121 through a main conduit 145 and the branch conduits 113 and 123. A valve 146 (Fig. 1) is provided in the main conduit to control the pressure in the line and in this way an equal amount of fluid pressure is exerted upon the upper and lower pistons 102 and 120. However, it may be necessary to adjust this pressure independently for the two cutter units, either because the resistance to the fluid pressure may not be the same in both cases or in order to exert a slightly heavier pressure on one side of the glass than on the other. One way of accomplishing this result is by providing bleeder valves 147 and 148 in the branch lines 113 and 123 respectively. (Fig. 3.) These valves may be of very simple construction and involve the use of only a small vent opening 149 and a valve screw 150. With this arrangement a controlled amount of air can be permitted to escape from either one or the other of the branch lines 113 and 123 to reduce the pressure in the cylinder fed by the line.

The cutting mechanism 28 can be moved upon the template 12 to cut a complete shape or pattern from a glass sheet or from a pair of nested sheets either by hand or it may be motor driven. A very simple but entirely satisfactory hand means is shown in the drawings. This comprises a bent metal strap 151 which is bolted to the vertical upright 37 on the cutter casting 35 and carries at its upper end a handle 152 to be grasped by an operator.

In operating the cutting apparatus of the invention, the glass sheets to be scored are first placed on the work support 14. In many cases, particularly when cutting bent sheets of glass which have been bent in pairs it is extremely important that the work be placed in exactly its proper position on the support in order to insure that the shapes to be cut from the sheets have exactly the proper curvature at all points throughout their area. For example, in cutting out door lights or windshields the cut shape must fit exactly into the opening that has been designed to receive it. Consequently, the sheets to be cut must not only be properly centered on the work support but they must also fit precisely into and contact the curved surface of the support at all points of contact. For this purpose the invention includes a suitable signalling arrangement including lights 153 and 154, or other indicating means, to show the operator that the glass sheets have been properly positioned on the work support.

The operation of the indicating means as shown in the drawings is accomplished through a plurality of double contact limit switches 155, 156, 157, and 158 that are connected in series with the indicator means. Each of the limit switches 155 to 158 includes a switch operating arm 19 which is pivotally mounted at one side of the switch box as at 159. The mounting may be of any suitable type and as here shown a piece of spring metal attached to the switch box at 159 is employed. Each of the arms 19 are equipped with a pair of contact plates 160 and 161 on their lower sides and each of these contacts plates is adapted to close a circuit between two of the four terminals 162, 163, 164 and 165 in each switch box.

The contact plates 160 and 161 are so arranged relative to the arms 19 and the switch terminals that upon downward movement of the arm 19 the contact plate 160 which is nearest the pivot point of the arm will first close the circuit between the terminals 162 and 163 while, upon continued movement of the arm, the plate 161 will close the circuit across the terminals 164 and 165. The several parts can be so positioned, or means can be provided for so adjusting them, that the arm 19 will travel any desired distance downwardly after the first circuit is closed before closing the second. For example, the distance may be as much as ⅛ of an inch, or it may be a matter of thousandths of an inch.

In actual practice, it has been found that a distance of $\frac{1}{16}$ of an inch, in the movement of the arm 19, between the closing of the first circuit and the closing of the second circuit gives very satisfactory results. In other words, the switch boxes and arms are so arranged that when the sheets of glass to be scored are arranged in exactly their proper position on the work support 14, the lower surface of the work will precisely fit against the upper surface of the work support at all points and consequently will be in a position to depress all four of the arms 19 to an extent sufficient to bring both of the contact plates 160 and 161 in each switch box into contact with its respective terminals 162—163 and 164—165.

Figure 10:
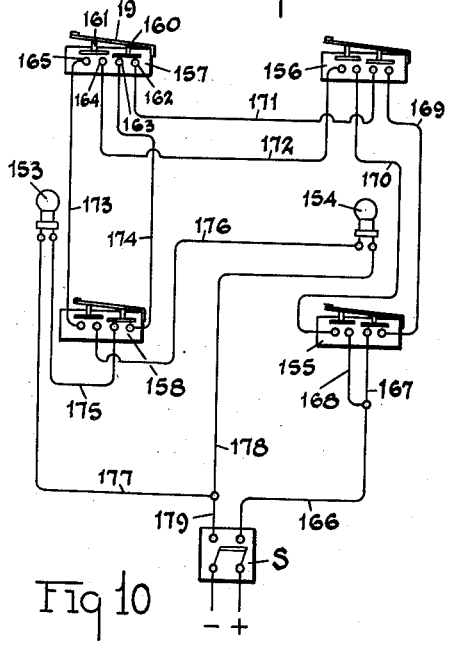
Fig. 10 is a wiring diagram for the work positioning means.
Figure 8:
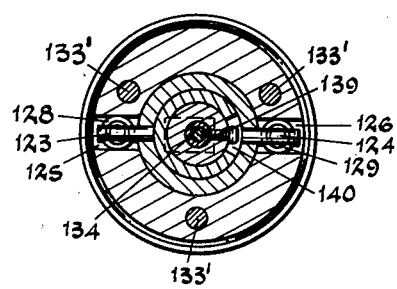
Fig. 8 is a horizontal section taken substantially on the line 8—8 in Fig. 7.

When this is the case, it will be seen from the diagram of Fig. 10 that, upon closing of the main switch S, current will flow through the positive line 166 to joining lines 167 and 168 and through them to switch 155. Since both circuits in all four of the switches 155 to 158 are closed the current will flow from switch 155 through lines 169 and 170 to switch 156 and from there through lines 171 and 172 to switch 157. From switch 157 the flow is through lines 173 and 174 to switch 158 and thence through lines 175 to 176 to signal lights 153 and 154, from which the current flows out through lines 177 and 178 to the negative line 179, thus completing the circuit through both signal lights and causing them to light up.

On the other hand, if the work is displaced on the work support to an extent sufficient to cause both contacts of any one of the switches 155 to 158 to open, the lights 153 and 154 will of course go out. However, at an intermediate point, that is, where the work is sufficiently displaced to cause one or more of the contact plates 161 to be out of contact with its terminals, but is near enough to exact position to maintain the circuit through all four of the contact plates 160, one light will be lighted and one will be out.

Thus, when this condition exists, current will flow in through the positive line 166 and branch line 167 to switch 155; then out through line 169 to switch 156 and out through line 171 to switch 157; from there out through line 174 to switch 158 and out through line 175 to light 153; then out through line 177 to the negative line 179. Since at this time at least one of the contact plates is out of contact with its terminals 164 and 165, the circuit through the light 154 will not be completed and this light will not go on.

The advantage of this arrangement and operation of signal lights is that when an operator first places the work on the work support if neither of the lights comes on he knows he is far enough out of position to cause the lower surface of the glass sheets to be out of contact with the work support by at least a sixteenth of an inch at some point. With this amount of displacement the operator may be able to determine visually how to move the work to more nearly center it on the work support. In any event he moves the work around on the support until one of the lights comes on. This shows immediately that the work is no more than $\frac{1}{16}$ of an inch out of contact with the surface of the support at any one of four widely spaced points. The adjusting of the work is then carried a little farther until both lights come on and the operator knows that the work is settled into its exactly fitting position on the support.

With the work properly placed, the operator then lowers the pad 23 of the quick acting clamp 21 down onto the top surface of the glass and swings the handle 24 to lock the work to the work support.

The valve 146 is then opened to feed compressed air through the main line 145 and branch lines 113 and 123 to the spaces above the pistons 102 and 120, thus bringing the cutting wheels 32 and 34 down into contact with opposite surfaces of the glass sheets to be cut. The next step is for the operator to grasp the handle 152 and by this means to run the cutting mechanism 28 completely around the template 12. When this has been done it will be found that a score pattern has been made on the top and bottom surfaces of the nested sheets 29 and 30 that is of exactly the same shape as the template 12 and, moreover, that the two opposite score lines are exactly superimposed and aligned with one another.

After the score has been made the valve 146 is closed and the compressed air released from the sleeves 103 and 121 through an exhaust valve 180. Whereupon the spring 111 and the springs 128 and 129 will be effective to lift the cutting wheels 32 and 34 from the scored glass sheets.

It will be clear that work supports of various sizes and shapes to accommodate sheets of any size or type of bend, and also flat sheets, may be employed; and also that templates designed to produce any desired shape or form of cut pattern may be used. In fact, it is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, and a cutter carriage supported solely upon said template and mounted to travel therealong including cutting tools adapted to engage opposite surfaces of said sheets.

2. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage supported solely upon said template and mounted to travel therealong including cutting tools adapted to engage opposite surfaces of said sheets, means for normally maintaining said cutting tools out of engagement with said work, and means for bringing said tools into operative engagement with the work and maintaining them in engagement during the cutting cycle.

3. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage supported solely upon said template and mounted to travel therealong including cutting tools adapted to engage opposite surfaces of said sheets, and fluid pressure operated means for bringing said tools into engagement with the work and maintaining them in such engagement during the cutting cycle.

4. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage supported solely upon said template and mounted to travel therealong including cutting tools adapted to engage opposite surfaces of said sheets, spring means for normally maintaining said cutting tools out of engagement with said work, and fluid pressure operated means for bringing said tools into operative engagement with the work and maintaining them in engagement during the cutting cycle.

5. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage supported solely upon said template and mounted to travel therealong including cutting tools adapted to engage opposite surfaces of said sheets, fluid pressure operated means for bringing said tools into engagement with the work and maintaining them in such engagement during the cutting cycle, and means for independently controlling the amount of fluid pressure exerted on each of the cutting tools.

6. In a machine for cutting predetermined shapes from curved sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage comprising a cutter casting, a pair of cutting units mounted on said casting and including cutting tools adapted to engage opposite surfaces of the sheets, a slide cooperating with said casting to embrace the template, means carried by said casting and corresponding means carried by said slide for rolling contact with said template, and means for resiliently clamping said template between the rolling contacting means on said casting and said slide.

7. In a machine for cutting predetermined shapes from curved sheets or plates of glass and the like, means for supporting the work to be cut, a template mounted in surrounding relation to said supporting means and having a configuration corresponding to the shape to be cut from said work, a cutter carriage comprising a cutter casting, a pair of cutting units mounted on said casting and including cutting tools positioned to engage opposite surfaces of the work, a slide cooperating with said casting to embrace the template, fixedly mounted rollers on said casting engaging one surface and one edge of the template, fixedly mounted rollers on said slide engaging the same surface and the opposite edge of said template, means for resiliently clamping said template between the rollers on said casting and the rollers on said slide engaging opposite edges of the template, a roller movably mounted on said slide engaging the opposite surface of said template, and means for resiliently urging said last-mentioned roller into contact with said last-mentioned surface of the template.

8. In a machine for cutting predetermined shapes from curved sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage comprising a cutter frame, a pair of cutting units mounted on said frame and including cutting tools adapted to engage opposite surfaces of the sheets, means for adjusting said units on the frame, a slide cooperating with said frame to embrace the template therebetween, means carried by said frame and corresponding means carried by said slide for rolling contact with said template, means for resiliently clamping said template between the rolling contacting means on said frame and said slide, and means whereby said cutting mechanism can be moved along said template.

9. In a machine for cutting predetermined shapes from curved sheets or plates of glass and the like, a support supporting the sheets in a substantially horizontal position and arranged inwardly of the edges of said sheets, a template mounted below said sheets and surrounding said support and having a configuration corresponding to the predetermined shape to be cut from said sheets, and a cutting mechanism supported solely on said template and mounted for travel therealong including cutting tools adapted to engage opposite sides of said sheets.

10. In a machine for cutting predetermined shapes from nested sheets or plates of glass and the like, a support supporting the sheets in a substantially horizontal position and arranged inwardly of the edges of said sheets, means for clamping the sheets on said support, a template surrounding said support and having a configuration corresponding to the predetermined shape to be cut from said sheets, and a cutter carriage supported solely upon said template and mounted to travel therealong including cutting tools adapted to engage an opposite surface of each of said nested sheets.

11. In a machine for cutting predetermined shapes from curved sheets or plates of glass and the like, a support supporting the sheets in a substantially horizontal position and arranged inwardly of the edges of said sheets, a template surrounding said support and having a configuration corresponding to the predetermined shape to be cut from said sheets, a cutter carriage comprising a cutter casting, a pair of cutting units mounted on said casting and including cutting tools adapted to engage opposite surfaces of the sheets, a slide cooperating with said casting to embrace the template, means carried by said casting and corresponding means carried by said slide for rolling contact with said template, means for resiliently clamping said template between the rolling contacting means on said casting and said slide, and means for mounting certain of said rolling contacting means for adjustment toward and away from the template.

12. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, and a cutter carriage mounted for travel along said template including a cutter frame, a pair of cutter units mounted on said frame for movement toward and away from the sheets to be cut, each of said units comprising a cylinder, a piston mounted for reciprocation within said cylinder, a cutting tool carried at one end of said piston and adapted to engage one surface of the sheets, and means for introducing fluid under pressure into said cylinder to move said tool into cutting engagement with said sheets.

13. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, and a cutter carriage mounted for travel along said template including a cutter frame, a pair of cutter units mounted on said frame for movement toward and away from the sheets to be cut, each of said units comprising a cylinder, a piston mounted for reciprocation within said cylinder, a cutting tool carried at one end of said piston and adapted to engage one surface of the sheets, means for normally maintaining the cylinder in retracted position and the tool out of contact with the sheets, and means for introducing fluid under pressure into said cylinder to move said tool into cutting engagement with said sheets.

14. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, and a cutter carriage mounted for travel along said template including a cutter frame, a pair of cutter units mounted on said frame, each of said units comprising a cylinder, a piston operating within said cylinder, a trailing type cutter head carried at one end of said piston and carrying a cutting tool adapted to engage one surface of the sheets, means for introducing fluid under pressure into said cylinder to move said tool into cutting engagement with the sheets, means for preventing rotary movement of the piston within the cylinder, and means for limiting the rotary movement of said trailing type cutter head.

15. In a machine for cutting predetermined shapes from sheets or plates of glass and the like, a support supporting the sheets in a substantially horizontal position and arranged inwardly of the edges of said sheets, a template surrounding said support and having a configuration corresponding to the predetermined shape to be cut from said sheets, and a cutter carriage supported solely upon said template and mounted to travel therealong comprising a pair of cutting units including cutting tools adapted to engage opposite surfaces of said sheets, and a shield carried by one of said units below the sheets and in surrounding relation to its respective cutting tool.

16. In a machine for cutting predetermined shapes from sheets or plates of curved glass and the like comprising means for supporting the work to be cut, a template associated with the work support, a cutting mechanism mounted to travel along said template and a cutting tool adapted to operatively engage a surface of the work as it travels along said template; the combination with said support, template and cutting mechanism of means for indicating the proper position of the work on said support comprising a plurality of spaced electrical contacts adapted to be closed by the work when it is in a predetermined position relative to said support and to the path of travel of said cutting tool and signalling means adapted to be actuated when all of said contacts have been closed.

17. In a machine for cutting predetermined shapes from sheets or plates of curved glass and the like comprising means for supporting the work to be cut, a template associated with the work support, a cutting mechanism mounted to travel along said template and including a cutting tool adapted to operatively engage a surface of said work as it travels around said template; the combination with said support, template and cutting mechanism of means for indicating the proper position of the work on said support comprising a plurality of spaced double contact switches one contact of each of which switches is adapted to be closed by the work when it approaches a predetermined position relative to said support and to the path of travel of said cutting tool and the other contact of each of said switches being adapted to be closed when the work is exactly in said predetermined position, a signalling means adapted to be actuated when all of the first-mentioned contacts of said double contact switches are closed, and a second signalling means adapted to be actuated when all of the contacts on all of said switches are closed.

18. In a machine for cutting predetermined shapes from curved sheets or plates of glass and the like comprising means for supporting the work to be cut, a template mounted above the work support, a cutting mechanism mounted to travel along said template and including a cutting tool adapted to operatively engage a surface of the work; the combination with said support, template and cutting mechanism of means for indicating the proper position of the work on said support comprising a plurality of double contact limit switches arranged in spaced relation around the periphery of said support and each of said switches including a switch arm normally located above the plane of the work support, means associated with said arm and actuated thereby for closing one of the switch contacts upon depression of the arm by the work when it approaches a predetermined position relative to said support and to the path of travel of said cutting tool, and means for closing the other switch contact by further depression of the arm by the work when the work is exactly in said predetermined position, a signalling means adapted to be actuated when the first-mentioned contact in all of said switches have been closed and a second signalling means adapted to be actuated when both the first and second mentioned contacts of all of the switches have been closed.

JOSEPH R. MORRIS.

REFERENCES CITED

The following references are of record in the file of this patent:

UNITED STATES PATENTS

| Number | Name | Date |
|---|---|---|
| 912,386 | Knight | Feb. 16, 1909 |
| 1,979,114 | Meiners | Oct. 30, 1934 |
| 1,999,594 | Owen | Apr. 30, 1935 |
| 2,042,553 | Rosin | June 2, 1936 |
| 2,048,935 | Klages | July 28, 1936 |
| 2,118,170 | Crowley et al. | May 24, 1938 |
| 2,256,120 | Lovenston | Sept. 16, 1941 |
| 2,328,405 | Williams et al. | Aug. 31, 1943 |
| 2,334,301 | Young | Nov. 16, 1943 |